Nov. 21, 1933.  E. DE RIDDER  1,936,083
WELDING METAL ARTICLES
Filed Oct. 3, 1931
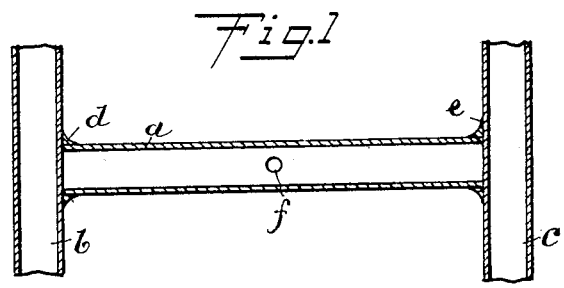
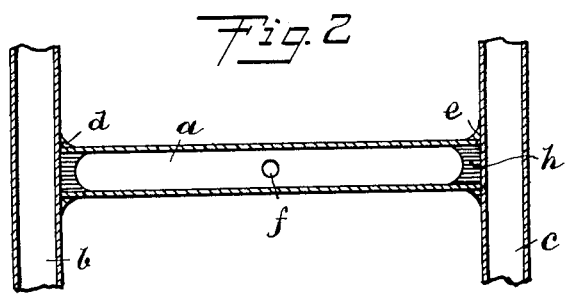
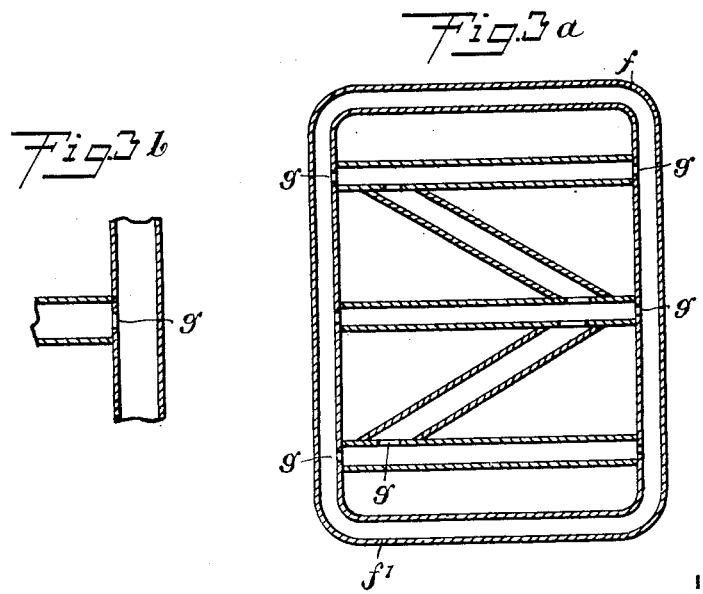
INVENTOR-
Ernst de Ridder
BY
Hauff & Warland
ATTORNEYS Patented Nov. 21, 1933

1,936,083

UNITED STATES PATENT OFFICE 1,936,083

WELDING METAL ARTICLES

Ernst De Ridder, Bitterfeld, Germany, assignor, by mesne assignments, to Magnesium Development Corporation, a corporation of Delaware Application October 3, 1931, Serial No. 566,653, and in Germany October 4, 1930

4 Claims. (Cl. 113—112)

The present invention relates to improvements in welding metal articles and more particularly to a process for the production of welded structural members of light metals with closed hollow cross-section.

All the welding agents (usually mixtures of halides of the alkali and alkaline-earth metals) employed for welding light metals, exhibit, to a greater or smaller extent, the property of exercising corrosive action on the metal, so that it is invariably necessary, after welding is finished, to remove all traces of welding agent, with the greatest care, by flushing out. In the production of welded structural members, with closed, hollow cross-section, such as tubes and tube connections, the removal of the residual traces of welding agent from the interior of the members, after welding, is impracticable. For this reason, the employment of magnesium or its alloys for the construction of such structural members has hitherto been out of the question, because the traces of welding agent give rise to corrosion extending outwardly from the interior.

The present invention relates to a process for producing structural members, with closed, hollow cross-section, of light metal, especially magnesium alloys, by which process these defects are prevented. The process is based on the observation that the usual welding agents do not set up corrosion of the metal when the access of fresh, and especially humid, air to the seat of the welds is prevented.

In order more clearly to understand the nature of the present invention, reference is made to the accompanying drawing which illustrates diagrammatically and by way of example a preferred method of carrying out the process.

In the drawing Figure 1 and Figure 2 represent a cross-sectional view in detail of a welded structural member in two different stages of production, whereas Figure 3a represents a cross-section of a frame-shaped structure consisting of a plurality of tubes welded together; and Figure 3b shows a welded joint of the said frame-shaped structure in detail.

With reference to Figure 1, the weld $d$ joining tube $a$ to tube $b$ is first produced, after which a hole $f$, preferably about 3 to 4 mms. in diameter, is bored at a convenient point in the tube $a$, but at a sufficient distance from the ends, and the weld at $e$ is then made. The air warmed by the welding operation is able to escape from the interior of the tube, through the hole $f$. The interior of the completed tube joint is now preferably flushed out, vigorously, with water or the like and the tube is reheated for a short time, to remove the moisture, or is dried with hot air, the hole $f$ being then welded up at once. The interior of the tube $a$ now contains dry air, which is no longer in communication with the atmosphere and consequently maintains the traces of welding agent, still remaining inside the tube, in a neutral condition as regards corrosion. The outside of the weld is then freed from the saline residue, in known manner, by washing or the like.

Increased immunity to corrosion can be obtained by pouring in, through the hole $f$, a small quantity of, for example, marine glue (a mixture of asphaltum and pale rosin), after completing the weld at $e$, the hole being then welded up, and the tube warmed and moved to and fro. The glue then settles on the seats of the welds, as indicated by $h$ in Figure 2, and thus, even in the event of leakage occurring in the seams of the welds, prevents fresh air from passing in at the joints and thus coming into contact with the inner side of the welds.

The aforesaid glue mixture may be replaced by tar or viscous lacquer or any other viscous substance forming a closely adhering coating upon the metal without having any reaction upon it.

A suitable application of the present process to the manufacture of more complex structural members built up of light metal tubes is illustrated in Figures 3a and 3b. Here the hole $f$ is provided at a convenient point of the member. According to Figures 3a and 3b, further holes $g$ are provided in the walls separating the tubes to be welded together, in order to give free passage to the flushing medium and subsequently to the hot air used for drying. When the welding operation is finished, the viscous lacquer is introduced through the hole $f$.

In the case of complex structural members, it has been found useful to fill them right up with the viscous sealing agent, at first, whereupon the agent is allowed to run out again, and the hole $f$ is finally closed by welding. In such cases, care must be taken to ensure that the inside of the hole $f$ after being closed by welding becomes covered over with the still viscous lacquer left inside the work-piece. So as to facilitate flushing after the welding is completed, it may be further advisable to provide a second hole $f'$, at the opposite end of the work-piece (Fig. 3a), to obtain a better flow of the flushing medium and of the hot air.

I claim:

1. A process for the production of welded structural members of light metals with closed hollow cross-section which comprises flushing the interior of the welded joint so as to remove the saline residues of the welding agent, then heating the interior so as to remove the residues of the flushing medium, and finally coating the interior seams of the welded joints with a highly viscous substance preventing the access of the air contained in the hollow member to said interior seams.

2. A process for the production of welded structural members of light metals with closed hollow cross-section which comprises flushing the interior of the welded joint so as to remove the saline residues of the welding agent, then heating the interior so as to remove the residues of the flushing medium, and finally coating the interior seams of the welded joints with a marine glue so as to prevent the access of the air contained in the hollow member to said interior seams.

3. A process for the production of closed welded structural members of light metal in tubular form which comprises providing an opening into the interior of said closed structure whereby the interior air heated by the welding operation is permitted to escape, flushing the interior of said closed structure so as to remove the saline residues of the welding agent employed in its construction, reheating said closed structure to remove the residues of the flushing medium to produce a dry atmosphere within the closed structure, introducing a highly viscous inert substance into the interior of said closed structure to coat the interior of said welded portions thereof, and finally closing the opening into said interior.

4. A process for the production of closed welded structural members of light metal in tubular form which comprises providing an opening into the interior of said closed structure whereby the interior air heated by the welding operation is permitted to escape, flushing the interior of said closed structure so as to remove the saline residues of the welding agent employed in its construction, reheating said closed structure to remove the residues of the flushing medium to produce a dry atmosphere within the closed structure, introducing marine glue into the interior of said closed structure to coat the interior of said welded portions thereof, and finally closing the opening into said interior.

ERNST DE RIDDER.